United States Patent [19]

Gleichman

[11] 4,166,659
[45] Sep. 4, 1979

[54] THRUST BEARING ASSEMBLY

[75] Inventor: Robert F. Gleichman, San Jose, Calif.

[73] Assignee: General Electric Company, Schenectady, N.Y.

[21] Appl. No.: 848,677

[22] Filed: Nov. 4, 1977

[51] Int. Cl.² ............................................. F16C 19/10
[52] U.S. Cl. ................................... 308/175; 308/219; 308/227; 308/231
[58] Field of Search ............... 308/139, 140, 142, 143, 308/144, 145, 146, 147, 160, 174, 175, 176, 194, 207 A, 214, 219, 227, 228, 229, 230, 231, 235; 310/90

[56] References Cited

U.S. PATENT DOCUMENTS

| 2,731,308 | 1/1956 | Wilcock | 308/160 |
| 3,873,863 | 3/1975 | Pew | 310/90 |

OTHER PUBLICATIONS

General Electric Company drawing No. 651E572, issued 12/20/67.

Primary Examiner—Charles E. Frankfort
Attorney, Agent, or Firm—Vale P. Myles

[57] ABSTRACT

A thrust bearing assembly for positioning and maintaining both washers of a spherical roller thrust bearing in alignment with a rotatable shaft that is supported by the bearing. The assembly is characterized by including a reciprocally movable chair member for seating the housing washer of the spherical roller thrust bearing in a manner that prevents the washer from being unduly tilted relative to its axis of rotation when the chair member slides axially relative to the shaft. A back portion of the chair member is made to exceed the height of the housing washer by a predetermined amount such that the relationship of its height to the overall diameter of the chair member is a desired ratio relative to the radial clearance of the chair member with its supporting housing. This relationship of the components prevents the housing washer and chair member from tilting more than an established tolerance angle relative to the axis of rotation of the shaft.

14 Claims, 4 Drawing Figures

THRUST BEARING ASSEMBLY

BACKGROUND OF THE INVENTION

The invention relates to thrust bearing assemblies and more particularly to such assemblies that are useful in supporting shafts of vertical electric motors on spherical roller thrust bearings in a manner that limits the maximum angle through which the housing washer of a given bearing can be tilted relative to a shaft supported on it.

Those familiar with loading requirements for thrust bearings have long known that spherical roller thrust bearings afford the most efficient support in certain applications on a dollar-per-pound-of-thrust basis. In general, such bearings are selected for use in applications where the combination of thrust loading and anticipated speed of rotation is between the relatively low speed, low thrust applications, for which angular contact ball bearings are suitable, and the higher speed, higher thrust applications for which Kingsbury bearings are more preferable. For example, one common application of spherical roller thrust bearings is in vertically mounted electric motors used to drive pumps. It is necessary in such an application to assure that the motor thrust bearing maintains the motor shaft in accurate alignment with a predetermined axis of rotation in order to prevent the rotor supported on the shaft from rubbing against the stator and to prevent other rotating parts from striking adjacent stationary parts. The applicant has found that undesirable misalignment of such a motor shaft can occur if the housing washer of a spherical roller thrust bearing supporting the thrust loading of the shaft becomes excessively tilted. Thus, controlling the tilt is important because excessive tilt causes more radial movement of the rotor shaft than is permitted by typical radial clearance between the bearing and its housing, particularly when the bearing is supported on springs as is common. As the housing washer part of the bearing tilts, it allows the rollers and shaft washer parts to move radially, while still contacting the housing washer raceway which is spherical in contour. It has been discovered that this radial movement, if not controlled by controlling the amount of tilt, can be great enough to cause excess vibration or cause striking between the rotating and stationary parts of the motor. It is important to realize that when such a spherical roller thrust bearing tilts, it causes a greater shift in the position of the shaft centerline than is permitted by the radial clearance between the housing washer and its seating support.

The risk of such undesirable tilting of the housing washer of a spherical roller bearing used as a thrust bearing for a vertical motor is substantially increased by the normal mode of operation of such motors and bearings. Due to the axial upthrust forces applied to such a motor by a pump when it is started, the shaft washer of the support bearing tends to rise away from its cooperating housing washer. Such bearing separation can persist for extended periods in some pumping applications when upthrust is applied to a supported motor shaft during a line filling operation. In order to prevent the bearing from becoming separated during this frequently encountered start-up phase of motor operation, it is common practice to spring-load the housing washer of the thrust bearing to continuously bias it toward the shaft washer, thereby to hold the parts of the bearing together when the supported shaft rises during start up or due to other forces applied to the shaft.

It is also common practice to limit the amount of upward movement of the shaft by adjusting the motor end play by arranging another bearing on the shaft that takes the upward thrust load. However, it is always necessary to retain some end play in such motors so that the bearings will not be loaded against each other during normal operation, accordingly, the risk of the thrust bearing being excessively tilted remains.

If there were no radial forces applied to a spherical thrust bearing when its housing washer is lifted off of its seat by biasing springs during light thrust load or start-up conditions of the motor, there would be little risk of the bearing tilting. However, the unbalanced magnetic pull on the motor shaft caused by the rotor being slightly off center in the motor, as well as by other unbalanced forces inevitably present in such motors, combine to exert some radial force on the thrust bearing. This unbalanced force tends to shift the shaft and tilt the bearing housing washer relative to its normal running seat. Such tilting action further increases the unbalanced magnetic force on the rotor and accentuates the risk of excessive bearing tilt. If a housing washer becomes sufficiently tilted during such a start-up or upthrust running condition during operation of a motor, it can either cause the rotor to rub on the stator or cause contact between other rotating and stationary parts and damage them. In other circumstances, where the degree of tilting of such bearings is slighter, the detectable undesirable symptom may be excessive vibration.

These major problems encountered in some applications of prior art spherical roller thrust bearings have long been recognized and in some vertical motor applications utilizing these bearings an attempt has been made to avoid rubbing and vibration problems by combining a separate guide bearing with it, at an axially spaced location on the supported motor drive shaft. Such a second bearing is designed to prevent the drive shaft from shifting unduly in a radial direction relative to its desired axis of rotation. That type of solution has been effective insofar as it serves to prevent the destruction of motors due to rubbing between adjacent mechanical parts or their rotor and stator assemblies; however, it is an expensive solution. Moreover, great care must be taken in the design, construction and assembly of such an arrangement to prevent the guide bearing from accepting thrust load which could lead to its early failure.

In view of the many applications where the use of spherical roller thrust bearings are desirable on a dollar-per-pound-of-thrust evaluation basis, it is apparent that an economical solution to the problem of thrust bearing tilting is very beneficial.

OBJECTS OF THE INVENTION

Accordingly, it is a primary object of the present invention to provide a thrust bearing assembly that accurately and reliably supports a shaft within a predetermined range of radial movement relative to a desired axis of rotation.

Another object of the invention is to provide a spherical roller thrust bearing assembly that includes a chair member for preventing the housing washer of the bearing from being tilted more than a predetermined angular degree during operation of a vertical motor supported by the bearing.

Yet another object of the invention is to provide a thrust bearing assembly for a vertically mounted electric motor that is operable to allow the parts of the bearing to be moved axially while preventing the housing washer from tilting more than a predetermined degree relative to the axis of rotation of the motor shaft.

Still another object of the invention is to provide a thrust bearing assembly that incorporates a spherical roller bearing having commercially available dimensional tolerances and a relatively large diameter-to-height ratio in combination with a chair member for seating the bearing on a supporting body in a manner that prevents the bearing from being tilted more than a predetermined angular degree relative to the supporting body.

Additional objects and advantages of the invention will be apparent to those skilled in the art from the description of it presented herein with reference to the accompanying drawings.

SUMMARY OF THE INVENTION

In one preferred embodiment of the invention, a thrust bearing assembly is provided for positioning a spherical roller thrust bearing within a predetermined range of radial and angular movement relative to the axis of rotation of a shaft supported by the bearing. This function is afforded by a chair member used in the assembly to seat a housing washer of the bearing in a manner that prevents the washer from being excessively tilted. A supporting frame for the chair member is provided with a cylindrical surface that limits radial movement of the back portion of the chair member to retain it within a predetermined radial clearance. The ratio of the height of the back portion of the chair member to its overall diameter is determined in relation to the radial clearance of the chair member in its support so as to prevent the chair member and the bearing seated on it from being tilted more than a predetermined angular degree when they are moved axially relative to a supporting frame.

BRIEF DESCRIPTION OF THE DRAWING

In FIGS. 1 and 4, the bearing arrangements are shown in the positions they would assume when normal downthrust axial load is applied to a supported shaft.

DESCRIPTION OF THE PREFERRED EMBODIMENT

Figure 1:
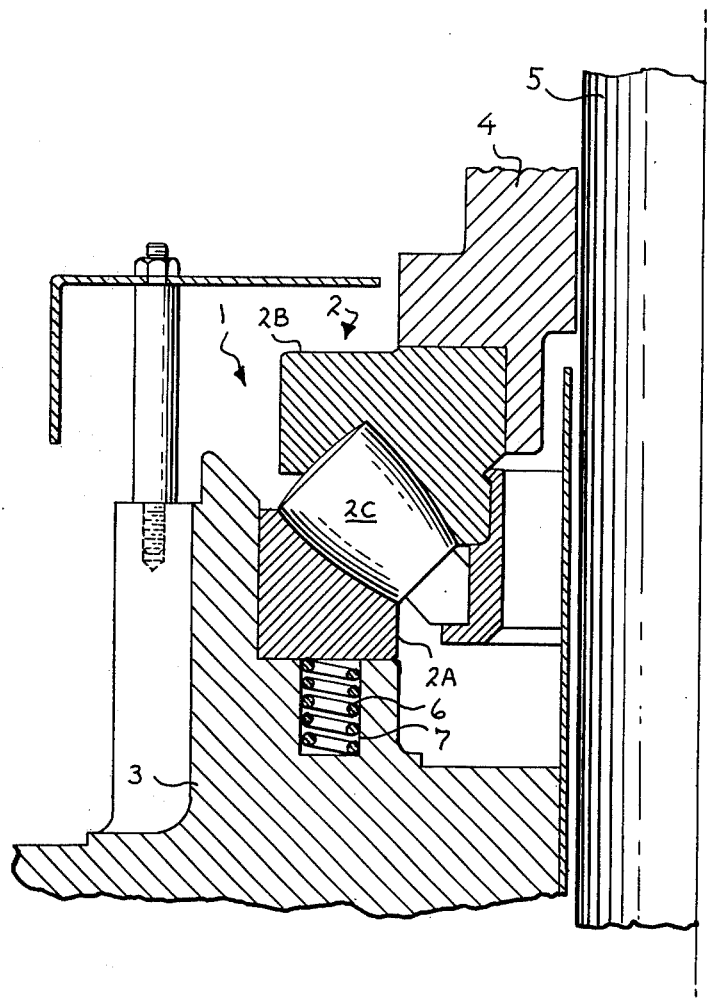
FIG. 1 is a side elevation of a thrust bearing assembly of a type known in the prior art for supporting a vertical electric motor shaft of a design typically used in pumping applications.

To orient the reader relative to the bearing art and facilitate a description of the invention, reference is first made to FIG. 1 of the drawing which illustrates a common prior art type of thrust bearing assembly 1 utilizing a spherical roller thrust bearing 2 consisting of a housing washer 2A, a shaft washer 2B and a plurality of convexly tapered rollers, one of which is designated 2C. In the illustrated application, the bearing 2 is seated on a supporting body 3 that, in this case, forms part of the end shield or housing of a vertical electric motor. The shaft washer 2B of the bearing is seated on a thrust collar 4, which in turn is secured to a shaft 5 in any conventional manner by a suitable securing means (not illustrated). A plurality of compression springs 6 are housed in a recess 7, formed in the supporting body 3, to provide a resilient biasing force that holds the housing washer 2A against the rollers (2C) when a start-up operation of the motor causes the shaft 5 to rise relative to the bearing seat on support body 3, as explained above. As is typical in such prior art thrust bearing assemblies, radial clearance is provided between the support body 3 and the outer peripheral surface of the housing washer 2A so that the washer can move freely in an axial direction responsive to the biasing force of the springs 6. Consequently, as mentioned above, occasionally the housing washer 2A will become tilted and cause the axis of rotation of shaft 5 to shift as will now be more fully explained.

Figure 2:
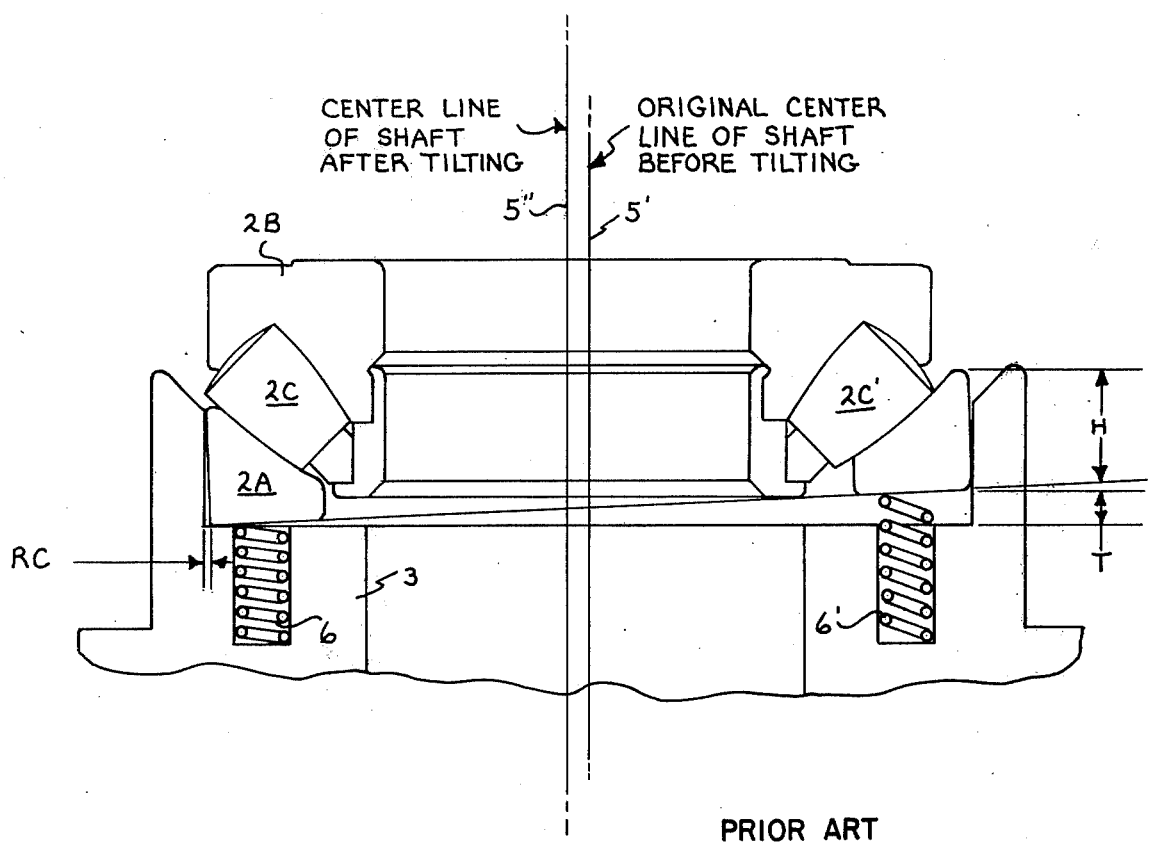
FIG. 2 is a side elevation of a schematically illustrated thrust bearing showing the amount of radial displacement of the axis of a supported shaft that will occur when the housing washer of the bearing is tilted a given amount relative to its seat.

The nature and consequence of such tilting of the housing washer 2A are illustrated in exaggerated form in the schematic drawing of FIG. 2, to which reference is now made. In FIG. 2, like reference numerals are used to designate parts similar to those shown in FIG. 1; thus, a supporting body 3 is shown in outline form and springs 6 and 6' are schematically illustrated. Rather than illustrating a shaft, such as shaft 5 shown in FIG. 1, there is simply depicted in FIG. 2 the original centerline 5' for such a shaft before tilting. Also, a second displaced centerline 5" is shown which is the position taken by the centerline of the shaft when the housing washer 2A is tilted in the manner indicated in FIG. 2. It can be seen that in response to the unbalanced radial force such tilting of the housing washer 2A is possible due to the curved running surfaces of the rollers 2C, 2C', etc. and the spherical raceway surface of housing washer 2A. Thus, the centerline of a shaft (5) can move radially from position 5' to position 5" which may be enough to cause rubbing between a rotor supported on the shaft and a stator that is normally supported in fixed relation to the frame or supporting body 3.

Before the present invention, attempts were made to prevent this kind of undesirable tilting of such a housing washer by forming a relatively close tolerance or radial clearance between the washer and the inner cylindrical surface of the supporting body within which it is seated. Several techniques were developed for reducing this clearance. For example, the bearing supporting body (3) could be machined to a close tolerance with the diameter of a standard washer, such as the washer 2A depicted in FIG. 2. Alternatively, shims were used between the outer peripheral surface of the washer 2A and the inner cylindrical surface of the supporting body (3). However, these solutions, and others attempted in efforts to solve the bearing tilting problem, were found to be undesirable for a variety of reasons. For example, the costs of close-tolerance machining and the difficulty of initially installing and later replacing bearings in a tight tolerance housing creates manufacturing and service problems. Also, it is difficult to maintain shims in position when a raceway (2A) is moved axially by the biasing force of springs, such as springs 6, 6', etc., as thrust loading on a supported shaft (5) is reduced. Furthermore, the appearance of shims is frequently found objectionable.

Figure 3:
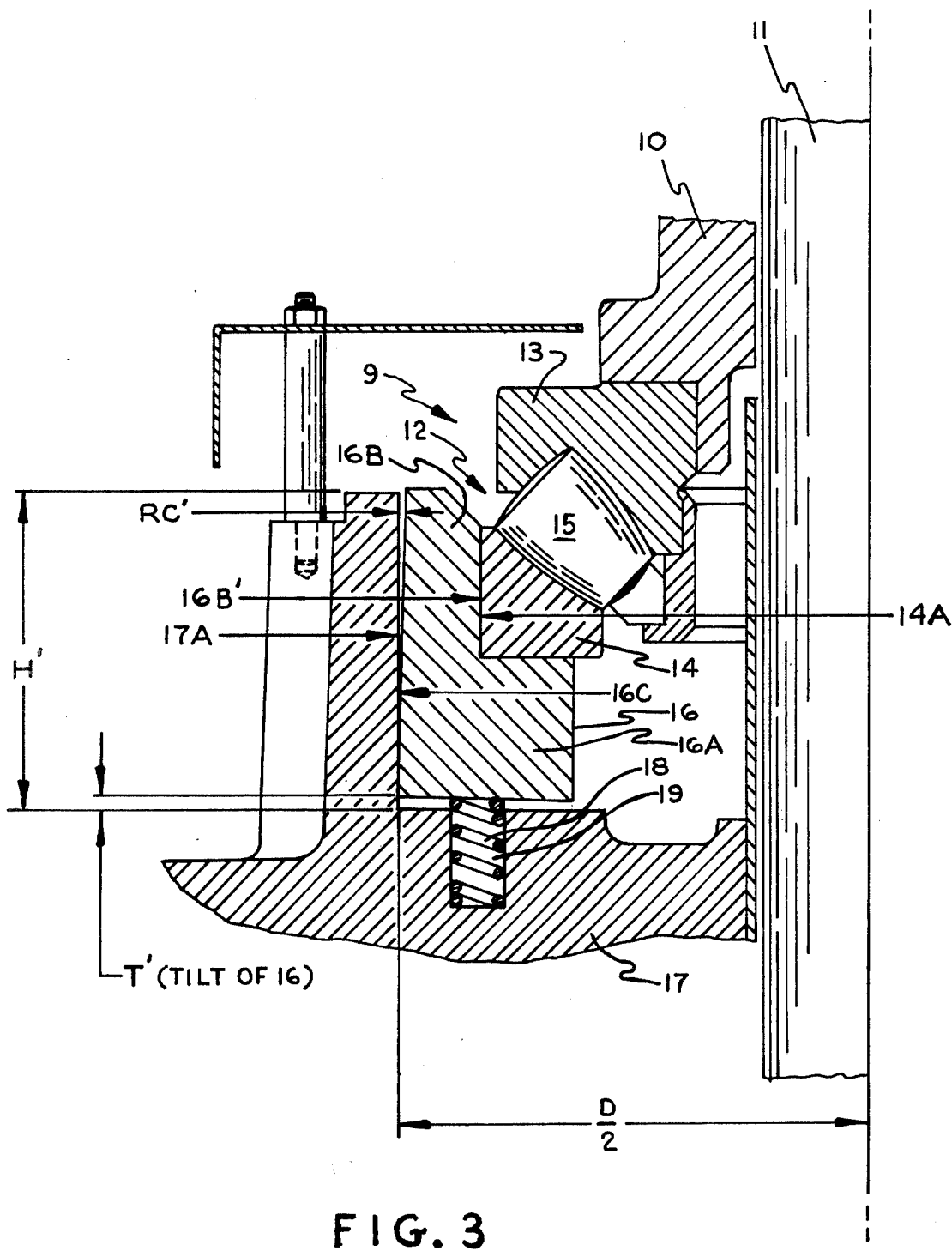
FIG. 3 is a side elevation of a thrust bearing assembly constructed pursuant to the present invention and operable to support the type of motor shaft shown in FIG. 1.

The present invention affords a more desirable solution for such bearing tilting problems by providing a thrust bearing assembly including a unique chair member, as will now be described in detail with reference to FIG. 3 of the drawing. To facilitate a comparison of the preferred embodiment of the invention shown in FIG. 3 with the typical prior art type of spherical roller thrust bearing shown in FIG. 1, a closely related type of basic bearing structure is shown. Thus, in FIG. 3 the thrust bearing assembly 9 of the invention, that is operable to position a spherical roller thrust bearing within a continuously maintained accurate range of alignment with a rotatable shaft supported on it, comprises a thrust collar 10 mounted on a shaft 11, which it will be understood is the rotor-supporting shaft of a vertical electric motor (not otherwise further illustrated). Any suitable conventional means (not shown) may be used to fasten the thrust collar 10 in fixed relation to the shaft 11 for rotation therewith. A spherical roller thrust bearing 12 having a shaft washer 13, an annular housing washer 14 and a plurality of convexly tapered rollers, one of which is designated as roller 15, mounted for rotation between the raceways of washers 13 and 14. The shaft washer 13 is seated against the thrust collar 10 in a suitable conventional manner, such as that shown.

Pursuant to the invention, the assembly 9 includes a chair member 16 having a seat portion 16A and a back portion 16B. The housing washer 14 of the spherical roller thrust bearing 12 is seated on the seat portion 16A of the chair member, and the back portion 16B of the chair member is made a predetermined amount greater in height at its peripheral outer surface 16C than the height of the outer peripheral surface 14A of the housing washer 14. The height H' of the chair member is determined pursuant to the invention, as a function of the radial clearance between the outer diameter of the chair member with support body 17 and the overall diameter of the chair member 16, as will be more fully explained below.

A supporting body 17 that in this embodiment is affixed to the frame or housing of an electric motor which also supports a stator disposed concentrically around a rotor mounted on the shaft 11, is provided to seat the chair member 16 in sliding relationship thereon. The supporting body 17 is provided with an inner cylindrical surface 17A for limiting movement of the outer peripheral surface 16C of the back portion 16B of the chair member in order to retain it within a predetermined radial clearance, or range of radial movement relative to the supporting body 17.

A plurality of springs, such as the spring 18, are mounted in compression in suitable recesses, such as the recess 19 (or in an annular recess) formed in the support body 17, in order to bias the chair member 16 and the housing washer 14 of thrust bearing 12 upward when axial loading on shaft 11 is reduced during start up of the associated motor. Of course, the springs 18, etc. may be otherwise mounted in compression between the supporting body 17 and the chair member 16 to effect such biasing of the outer raceway 14 toward the shaft washer 13, as will be more fully explained later with reference to FIG. 4.

The chair member is made to perform the desired objective of preventing undue tilting of the housing washer 14, pursuant to the invention, despite the fact that a clearance is permitted between the housing washer 14 of bearing 12 and the back portion 16B of the chair member 16. Thus, in practicing the invention, no precision machining of either the washer 14 or the inner cylindrical surface 16B' of the back portion 16B of the chair member 16 is required to hold these members in close tolerance. This loose fit of the washer 14 in the chair member 16 assures that the raceway will be seated squarely on the seat portion 16A of the chair member rather than being tilted with respect to it. At the same time, the thrust bearing 12 is prevented from separating by the biasing force of the springs 18 that move the chair member 16 to follow the upward movement of shaft washer 13, as described above. The relatively greater height of the back portion 16B of the chair member in contact with the supporting body 17, operates to prevent tilting of the chair member due to the improved ratio of that height to its diameter, as will now be more fully explained.

A desired feature of the preferred embodiment of the invention is that the range of radial movement or clearance between the chair member 16 and the inner cylindrical surface 17A of the supporting body 17 can be made less than the range of radial movement between the housing washer 14 and the back portion of the chair member 16 in this embodiment. This tighter clearance is readily achieved because the chair member is custom made for the supporting body 17, rather than being a standardized commercial part like the bearing 12. Moreover, such tightness is feasible because the chair member need not be changed when a bearing is replaced due to wear. Also, there is less heat differential between the outer components in assembly 9 so they can safely be machined to a closer tolerance without causing binding to result from subsequent differential heating that might otherwise prevent axial movement of the housing washer.

It will be apparent that in given applications a range of suitable dimensions for the chair member 16 will be effective to obtain the limited tilting objective for the chair member selected in that application to practice the invention. An important aspect of the invention to be recognized in determining such alternative dimensions and relative ratios of dimensions is that the ratio of tilt for the chair member to the radial clearance of the outer diameter of the chair member with the supporting body 17 is equal to the ratio of the outer diameter of the chair member to the effective height of its outer peripheral surface. These dimensions, as applied to the preferred embodiment of the invention being described, are shown in FIG. 3 where outer diameter D (the illustration in FIG. 3 shows D/2) of the chair member 16 and the effective height H' of the peripheral outer surface of the back portion of the chair member are determined so that the quotient of D/H' is made less than 5 in order to assure proper achievement of the limited tilting effect of the invention when a desired radial clearance RC' is provided between chair member 16 and supporting body 17. In fact, it has been found preferable that this quotient be made less than about 3 when the invention is used for supporting the vertical shaft of an electric motor used in a pumping application.

As just indicated, this quotient is selected according to the tilt T' (the measure which corresponds to that shown in enlarged form at T in FIG. 2) found to be acceptable for a given radial clearance permitted between chair member 16 and the supporting body 17. For further clarification, a radial clearance RC between housing washer 2A and body 3 is illustrated in FIG. 2. A related type of clearance, designated RC' in FIG. 3, will be allowed between chair members 16 and supporting body 17. Consequently, in the preferred embodiment of the invention illustrated in FIG. 3, the predetermined range of radial clearance RC' is controlled such that the product of RC'×(D/H') is always less than 0.020 inches and is preferably less than 0.012 inches has been found that this optimum ratio enables the thrust bearing assembly 9 of the preferred embodiment of the invention illustrated in FIG. 3 to perform the desired objectives of the invention stated above in an optimum manner.

Figure 4:
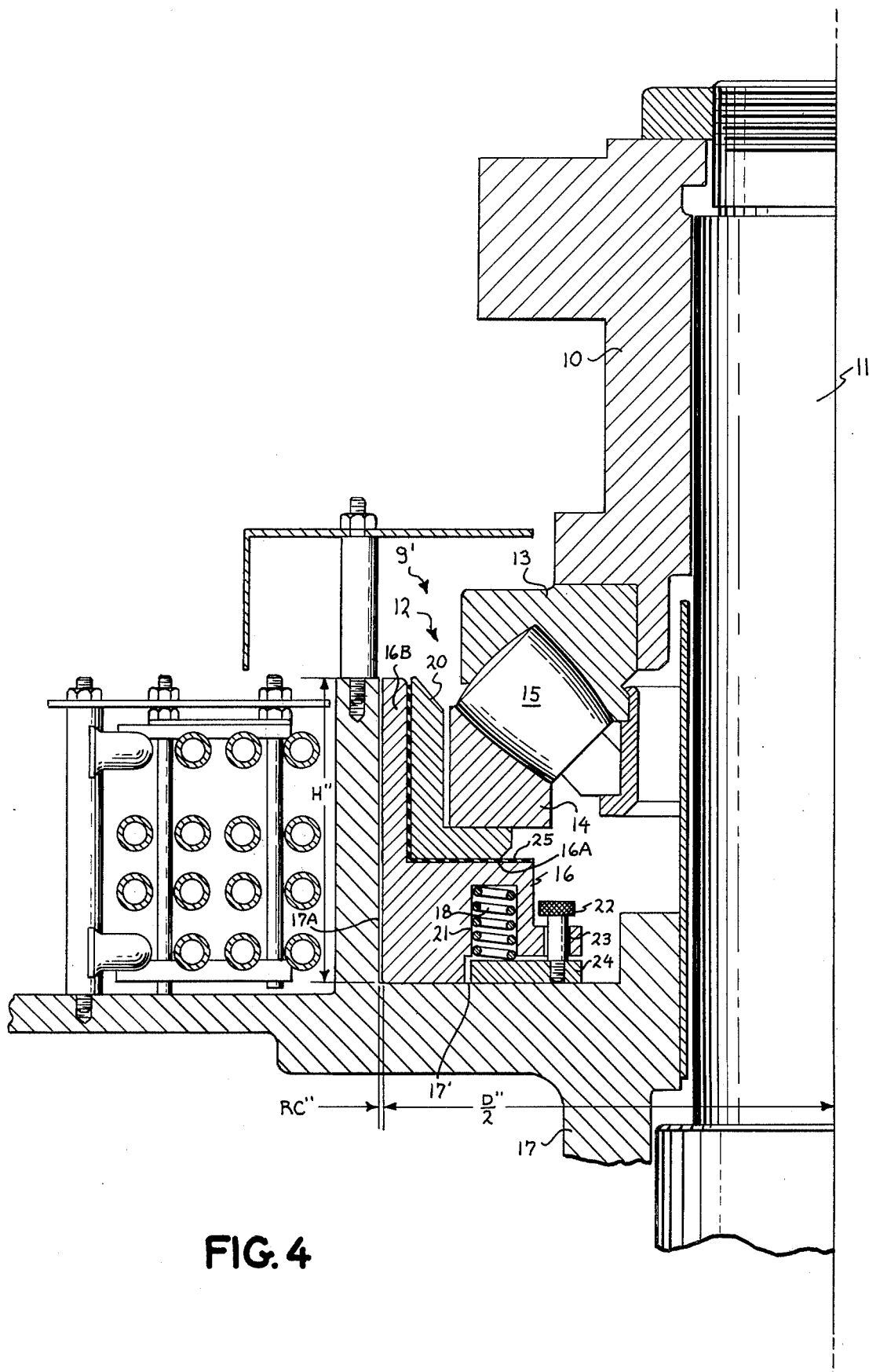
FIG. 4 is a side elevation view, partly in cross-section, showing a second embodiment of a thrust bearing assembly constructed according to the present invention and illustrated with respect to a typical vertical electric motor shaft and a portion of the motor housing.

A second preferred embodiment of the invention is illustrated in FIG. 4 of the drawing to which reference is now made. The same reference numerals used in FIG. 3 to designate like parts are again used in FIG. 4 to simplify the description of this embodiment of the invention. Thus, there is shown in FIG. 4 a thrust bearing assembly 9' for a dynamoelectric machine shaft 11 that is mounted for rotation about an essentially vertical axis. The assembly comprises a thrust collar 10 mounted in any suitable conventional manner, such as that shown, to the shaft 11 for rotation with it. A spherical roller thrust bearing 12 having annular shaft and housing washers 13 and 14 and a plurality of convexly tapered rollers, one of which is designated as the roller 15 mounted therebetween, are positioned in the assembly so that the shaft washer 13 is seated against the thrust collar 10. An annular chair member 16 having a seat portion 16A and a back portion 16B is slidably seated in a supporting body 17 that forms part of the end shield or housing of a vertical electric motor, the shaft 11 of which is supported by the thrust bearing assembly 9'. An annular insert member 20, generally L-shaped in radial cross-section, as shown, is shrunk fit into the chair member 16 and the outer raceway 14 is positioned on the L-shaped insert member 20.

The supporting body 17 is provided with a generally horizontal surface 17' for seating the outer bottom surface of the seat portion 16A of the chair member 16. Also, the supporting body 17 is provided with a cylindrical surface 17A disposed around the back portion 16B of the chair member 16 to retain it within a predetermined range of radial movement or radial clearance RC" relative to the supporting body 17, in the manner described above with reference to RC and RC' in FIGS. 2 and 3.

A plurality of springs, one of which is shown as the spring 18, are compressed between the surface 17' of supporting body 17 (through ring 24) and the chair member 16, thereby to resiliently bias the housing washer 14 toward the shaft washer 13 for the purpose explained above. In this embodiment of the invention, the springs 18, etc. are housed in a recess 21 formed in the bottom outer surface of the seat portion 16A of the chair member 16.

A further improvement in this form of the invention is the inclusion of a ring 24 as a means to retain the springs 18 in annular recess 21 to facilitate assembly of chair 16 into supporting body 17. Ring 24 is held to chair 16 by a plurality of shouldered bolts (one of which is shown as bolt 22). The bolts are threaded into suitable apertures in the ring and are slidably disposed in apertures, such as aperture 23, through an inwardly projecting lip on the seat portion 16A of the chair member 16. Ring 24 also serves to bridge across radial slots (not shown) provided in supporting member 17 as oil inlet passages to the bearing.

Again, pursuant to the invention, the height H" of the chair member 16 is made such that the quotient of D"/H" is maintained less than 5 while the radial tolerance RC" is made such that the product of RC"(D"/H") is kept less than 0.020 in order to assure optimum limited tilting operation of the assembly 9' according to the principles of the invention.

Another desirable feature of the embodiment of the invention shown in FIG. 4 is that it can be used to electrically isolate the shaft 11 from the housing (17), if desired, to prevent electric currents in the shaft from passing through the bearing. A layer of suitable dielectric material 25, such as a commercially available polyester impregnated glass, is positioned between the insert 20 and the chair member 16, as shown. In the prior art it was common practice to place such insulation in the support member 17. Because member 17 is a relatively large part that is difficult to handle during machining and when shrinking the insert into position, it was difficult to retain the integrity of such insulation systems when the parts of the assembly were washed following machining. Thus, the present invention affords a desirable improvement in this regard.

From the foregoing description of the invention structure and related theory of providing certain specified relative ratios for its component parts, those skilled in the art will understand and appreciate its mode of operation. Also, it will be apparent to those skilled in the art that various modifications and alterations may be made in applying the invention, therefore, it is my intention to encompass within the following claims the true spirit and scope of the invention.

What I claim as new and desire to secure by Letters Patent of the United States is:

1. A thrust bearing assembly for positioning a spherical roller thrust bearing in alignment with a rotatable shaft supported by said bearing, comprising, a thrust collar mounted on the shaft and rotatable therewith, a spherical roller thrust bearing having annular shaft and housing washers and a plurality of convexly tapered rollers mounted for rotation between said washers, said shaft washer being seated against the thrust collar, an annular chair member having a back portion and a seat portion, said housing washer being seated on the seat portion of said chair member, the back portion of the chair member being substantially greater in height at its peripheral outer surface than the height of said housing washer, the height of said back portion being no less than one-fifth of the outer diameter of the chair member, and a supporting body having an inner cylindrical surface for limiting movement of the outer peripheral surface of the back portion of said chair member to retain it within a predetermined range of radial clearance relative to said supporting body.

2. An invention as defined in claim 1 including a plurality of springs mounted in compression between said supporting body and said chair member to bias the housing washer toward the shaft washer.

3. An invention as defined in claim 2 wherein each of said springs is housed in a recess formed in the outer surface of the seat portion of the chair member.

4. An invention as defined in claim 1 wherein the outer diameter of said chair member equals D, the height of the outer peripheral surface of the back portion of said chair member equals H', and the quotient of D/H' is made less than about 5.

5. An invention as defined in claim 4 wherein said predetermined range of radial clearance equals RC' and the product of RC'(D/H') is made less than about 0.020.

6. A thrust bearing assembly for a dynamoelectric machine shaft that is mounted for rotation around an essentially vertical axis comprising a thrust collar mounted on the shaft for rotation therewith, a spherical roller thrust bearing having annular shaft and housing washers with a plurality of convexly tapered rollers mounted therebetween, said shaft washer being seated against said thrust collar, an annular chair member having a back portion and a seat portion extending radially inward from the back portion, the height of said back portion being no less than one-fifth of the outer diameter of the chair member, an annular insert member generally L-shaped in radial cross-section, said housing washer being seated on the insert member, said insert member being seated on the chair member, and a supporting body mounted in fixed relation to the frame of said machine, said supporting body having a generally horizontal surface for seating the lower surface of the seat portion of said chair member and having a cylindrical surface disposed around the back portion of said chair member to retain it within a predetermined range of radial movement relative to said supporting body.

7. An invention as defined in claim 6 including a plurality of springs compressed between said supporting body and the chair member thereby to resiliently bias the housing washer toward the shaft washer.

8. An invention as defined in claim 7 including a recess in said chair member for housing said springs and an annular ring member mounted on the chair member for retaining the springs in the recess.

9. An invention as defined in claim 7 wherein said predetermined range of radial clearance (RC") of the chair member relative to the supporting body is smaller than the radial clearance (RC) between said housing washer and the insert member.

10. An invention as defined in claim 7 wherein the height (H") of the chair member measured parallel to the axis of rotation of the machine shaft, is at least 20 percent greater than the height of the housing washer (H) measured in the same direction.

11. An invention as defined in claim 10 wherein the outer diameter of the chair member equals D", the height of the outer peripheral surface of the back portion of said chair member equals H", and the quotient of D"/H" is less than about 5.

12. An invention as defined in claim 11 wherein the quotient of D"/H" is less than about 3.

13. An invention as defined in claim 7 wherein each spring in said plurality of springs is positioned at least partially in a recess formed in the outer surface of the seat portion of the chair member.

14. An invention as defined in claim 6 including a layer of dielectric material positioned between the insert member and the chair member to electrically isolate the thrust collar from said supporting body.

* * * * *